United States Patent
Kono et al.

(10) Patent No.: US 8,469,646 B2
(45) Date of Patent: Jun. 25, 2013

(54) CLIP

(75) Inventors: Yuya Kono, Okazaki (JP); Kiyoshi Shimizu, Toyohashi (JP)

(73) Assignee: Daiwa Kasei Kogyo Kabushiki Kaisha, Aichi-ken (JP)

( * ) Notice: Subject to any disclaimer, the term of this patent is extended or adjusted under 35 U.S.C. 154(b) by 215 days.

(21) Appl. No.: 13/044,151

(22) Filed: Mar. 9, 2011

(65) Prior Publication Data

US 2011/0222988 A1    Sep. 15, 2011

(30) Foreign Application Priority Data

Mar. 10, 2010   (JP) ................... 2010-052893

(51) Int. Cl.
*F16B 19/00* (2006.01)

(52) U.S. Cl.
USPC ........................................ 411/508; 411/510

(58) Field of Classification Search
USPC ................. 411/508–510, 340, 392, 411, 502
See application file for complete search history.

(56) References Cited

U.S. PATENT DOCUMENTS

| 3,115,804 | A | * | 12/1963 | Johnson | 411/338 |
| 5,558,346 | A | * | 9/1996 | Hartery | 220/787 |
| 5,660,513 | A | | 8/1997 | Shibanushi | |
| 5,724,709 | A | * | 3/1998 | Kittmann et al. | 24/453 |
| 7,186,068 | B2 | | 3/2007 | Zoubek et al. | |
| 2005/0242247 | A1 | * | 11/2005 | Geiger | 248/74.3 |
| 2007/0258795 | A1 | * | 11/2007 | Nakazato | 411/508 |
| 2009/0191025 | A1 | * | 7/2009 | Jackson, Jr. | 411/510 |

FOREIGN PATENT DOCUMENTS

| DE | 2 226 315 | 7/1973 |
| DE | 2 261 824 | 6/1974 |
| DE | 102 45 276 A1 | 4/2004 |
| EP | 2 075 477 A1 | 7/2009 |
| JP | 11-093923 | 4/1999 |
| WO | WO 2009/069689 A1 | 6/2009 |

* cited by examiner

*Primary Examiner* — Gary Estremsky
(74) *Attorney, Agent, or Firm* — Douglas J. Christensen

(57) ABSTRACT

A clip may include an anchor portion, an elastic engagement strip and two ribs. The engagement strip is formed in a portion adjacent to a distal end of the anchor portion and is extended vertically therefrom toward a proximal end of the anchor portion. The two ribs are formed in an outer surface of the engagement strip and are vertically spaced from each other. The ribs are formed such that the rib that is away from the distal end of the anchor portion has a projection amount smaller than the rib that is close to the distal end of the anchor portion.

4 Claims, 4 Drawing Sheets

CLIP

BACKGROUND OF THE INVENTION

1. Field of the Invention

The present invention relates to a clip that is attachable to a metal panel to which a vehicle battery pack or other such devices is secured. More particularly, the present invention relates to a clip having an anchor portion that is capable of being inserted into a nut (a weld nut) welded to a metal panel and is capable of engaging a female thread formed in the nut.

2. Description of Related Art

This type of clip is already known and is taught, for example, by Japanese Laid-Open Patent Publication No. 11-093923. The clip includes an anchor portion (an engagement stem portion) that is capable of being inserted into a nut welded to a metal panel, and a plurality of blade-shaped ribs formed in an outer surface of the anchor portion. The ribs are vertically sequentially arranged in four rows along an axis of the anchor portion. The ribs are diagonally projected outwardly toward a proximal end of the anchor portion, so that the anchor portion can have a tree-shape as a whole.

The nut is welded to the metal panel while aligned with a through hole formed in the metal panel. Therefore, when the anchor portion of the clip is inserted into the through hole, the anchor portion can be inserted into the nut via the through hole. Upon insertion of the anchor portion into the nut, the ribs of the anchor portion can move within a female thread formed in the nut while elastically flexed, so that all of or a part of the ribs can engage the female thread of the nut. As a result, the clip can be attached to the metal panel via the anchor portion.

However, according to the clip in which the ribs are arranged along the axis of the anchor portion, when the anchor is inserted into the nut, a large insertion load (insertion resistance) can be produced. To the contrary, when the anchor is applied with a load in a direction in which the anchor is pulled out of the nut, the ribs can be easily elastically (reversely) flexed, so that the anchor can be easily pulled out of the nut.

Generally, there are two different types of nuts that are the same in inner diameter thereof and different from each other in thread pitch of female thread formed in the nuts. For example, the nut classified as "B 0205" of JIS (Japanese Industrial Standards) code has an inner diameter of 10 mm and a thread pitch of 1.25 mm. Conversely, the nut classified as "B 0207" of JIS code has an inner diameter of 10 mm and a thread pitch of 1.50 mm. Therefore, when the metal panel has the different types of nuts that are different from each other in thread pitch of the female thread formed in the nuts, different types of clips adaptable to such nuts must be manufactured and selectively used. This may lead to increased manufacturing costs. Further, working efficiency of the clip insertion operation can be reduced. Thus, there is a need in the art for improved clips.

SUMMARY OF THE INVENTION

For example, in one embodiment of the present invention, a clip is adaptable to each of nuts that are the same in inner diameter and are different from each other in thread pitch of female threads formed therein. The clip may include an anchor portion capable of being inserted into each of the nuts and capable of engaging each of the female threads of the nuts, a head portion formed in a distal end of the anchor portion and projected outwardly, a cylindrical surface formed in a proximal end of the anchor portion and having an outer diameter that is slightly smaller than an inner diameter of each of the nuts, elastic engagement strips formed in both side surfaces of the anchor portion and extended diagonally outwardly from a portion adjacent the head portion toward the proximal end of the anchor portion, and two ribs formed in an outer surface of each of the engagement strips and vertically spaced from each other. In order to allow the ribs of each of the engagement strips to engage each of the female threads that are different from each other in thread pitch thereof, the ribs are formed such that the rib that is away from the head portion has a projection amount smaller than the rib that is close to the head portion.

According to the clip thus constructed, when the anchor portion of the clip is inserted into each of the nuts, both of the ribs of each of the engagement strips can engage each of the female threads of the nuts. At the same time, the cylindrical surface formed in the proximal end of the anchor portion can interfere with (contact) an inner surface of each of the nuts, so that the anchor portion can be effectively prevented from being rattled in a radial direction of each of the nuts.

Further, when the anchor portion is applied with a load in a direction in which the anchor portion is pulled out of each of the nuts, the engagement strips can be urged to be flexed outwardly. However, at this time, the engagement strips can interfere with (contact) the head portion, so as to be effectively prevented from being flexed. Thus, the anchor portion can bear such a load.

Other objects, features and advantages of the present invention will be readily understood after reading the following detailed description together with the accompanying drawings and the claims.

DETAILED DESCRIPTION OF THE INVENTION

A detailed representative embodiment of the present invention will be described with reference to FIGS. 1 to 6.

Figure 1:
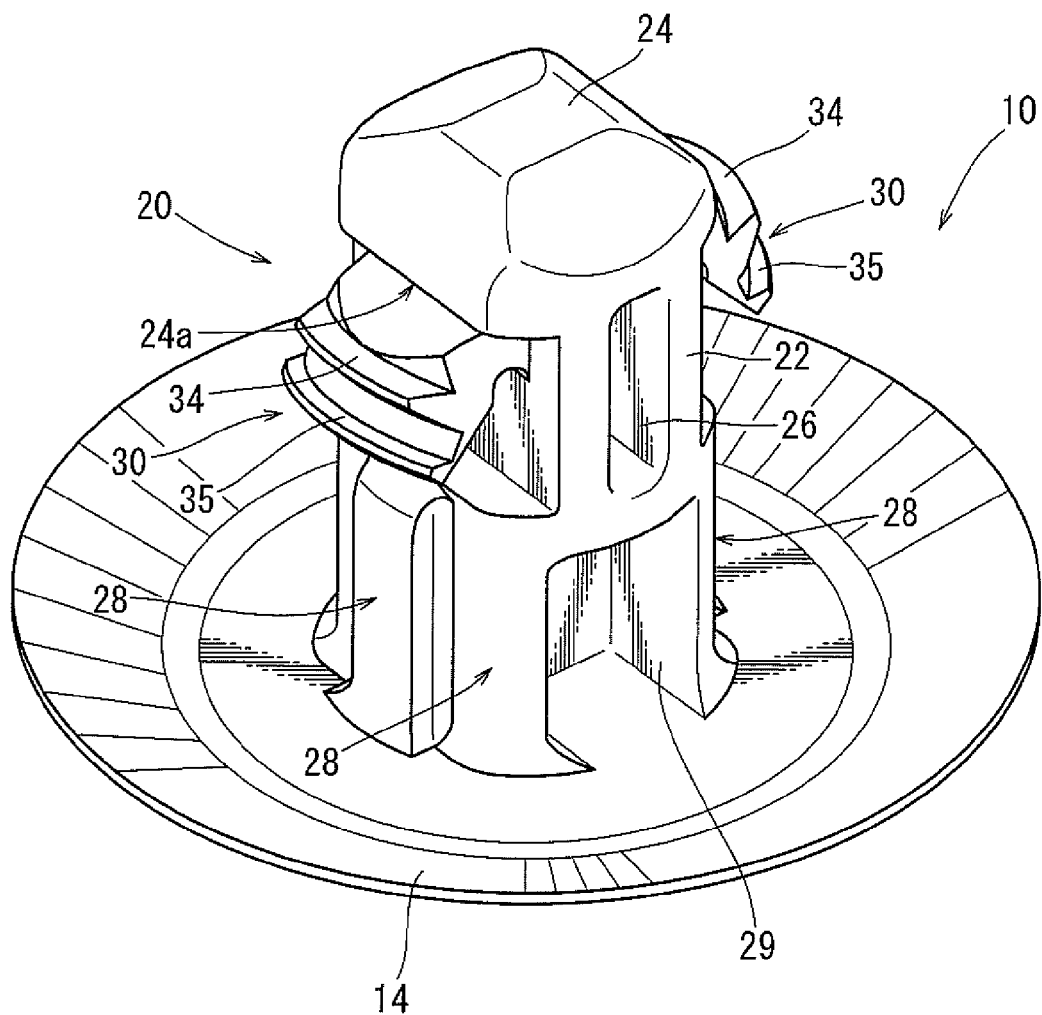
FIG. 1 is a perspective view of a clip according to a representative embodiment of the present invention.
Figure 2:
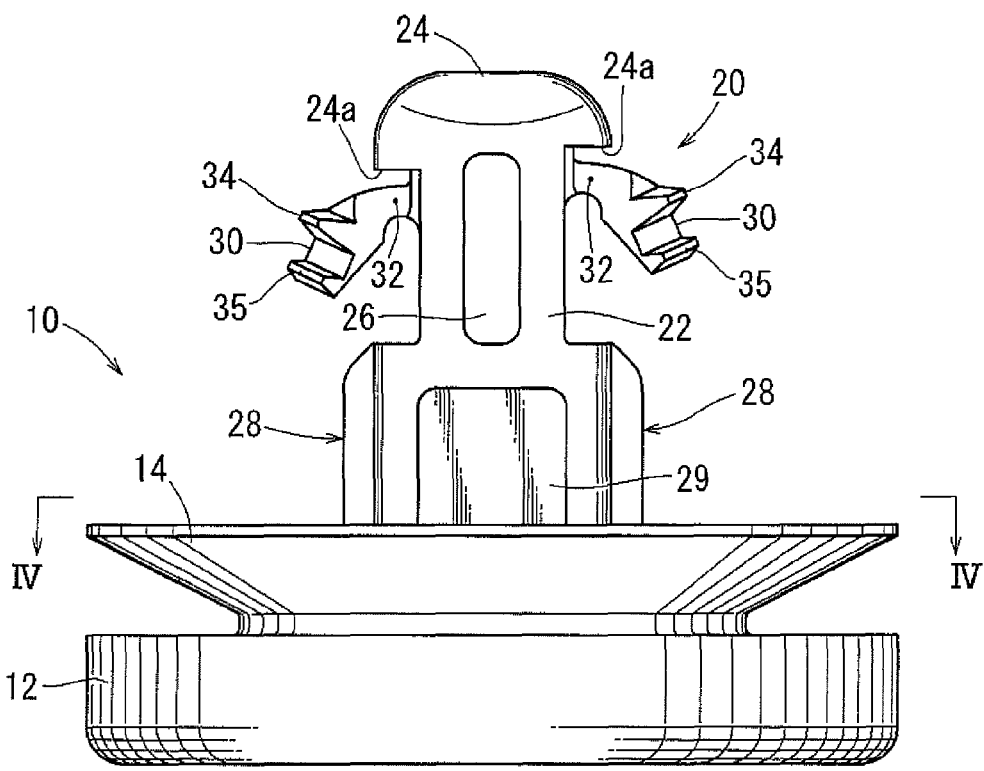
FIG. 2 is an elevational view of the clip.
Figure 3:
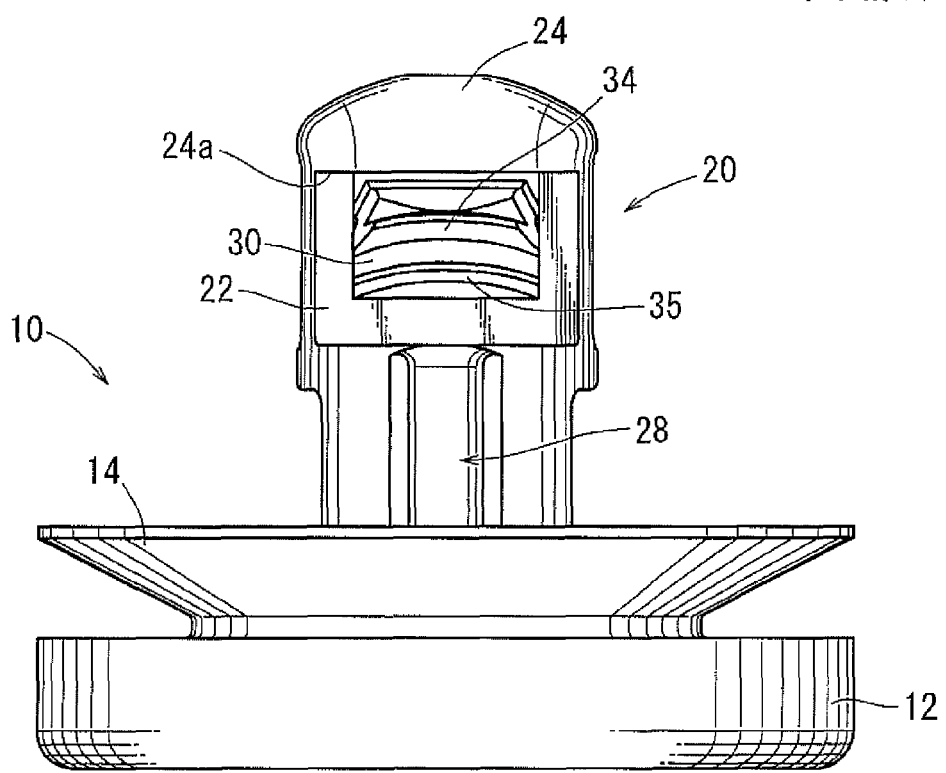
FIG. 3 is a side view of the clip.

A representative clip 10 may preferably be formed as an integrally molded product of resin. As shown in FIGS. 1 to 3, the clip 10 may preferably include a lower base portion 12, a stabilizer 14 and an upper anchor portion 20. The base portion 12 may preferably have a clamp (not shown) that is capable of circumferentially clamping a wiring harness or other such devises. The stabilizer 14 has a dish-shape and is capable of being elastically deformed. The stabilizer 14, when the clip 10 is attached to a metal panel 50 (which will be hereinafter described with reference to FIGS. 5 and 6), can be pressed against a surface of the metal panel 50, so as to provide known functions, i.e., to stabilize the clip 10 in posture and to close a through hole 52 formed in the metal panel 50.

The anchor portion 20 of the clip 10 includes a stem portion 22 that is extended upwardly from a central portion of the stabilizer 14. The stem portion 22 (the anchor portion 20) has a head portion 24 that is formed in a distal end thereof. The head portion 24 has a rounded outer profile. The head portion 24 is projected outwardly beyond right and left side surfaces of the stem portion 22, so as to form eave or overhang portions 24a therein. Further, the stem portion 22 has a pair of elastic engagement strips 30 that are formed in the right and left side surfaces thereof. The engagement strips 30 are positioned just below the overhang portions 24a of the head portion 24 and are extended diagonally outwardly toward a proximal end of the stem portion 22 (the anchor portion 20), which will be hereinafter described.

Upper and lower removed portions 26 and 29 are formed in the stem portion 22 in order to reduce weight of the clip 10. The removed portions 26 and 29 are formed in back and forth side surfaces of the stem portion 22 which surfaces are displaced 90 degrees relative to the right and left side surfaces about an axis of the stem portion 22 (the anchor 20).

Figure 4:
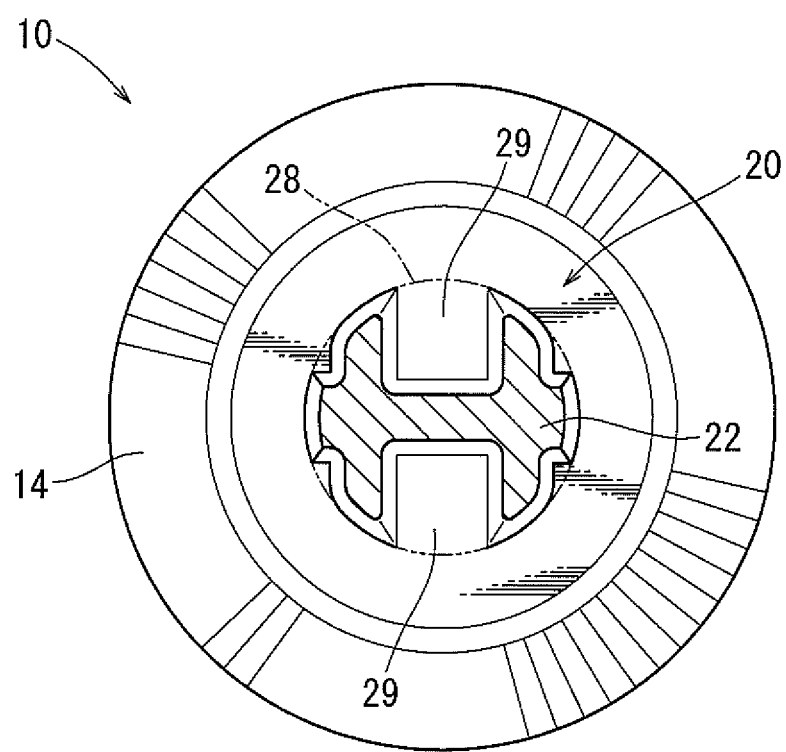
FIG. 4 is a cross-sectional view taken along line IV-IV of FIG. 2.

As best shown in FIG. 4, the proximal end of the stem portion 22 may preferably be shaped to have a circular arc surface or cylindrical surface 28. The cylindrical surface 28 may preferably correspond to a true circle that is centered on the axis of the stem portion 22 (the anchor 20). The cylindrical surface 28 has an outer diameter that is slightly smaller than an inner diameter (the same diameter) of each of two different types of nuts 40 and 41, which will be hereinafter described. Further, the cylindrical surface 28 is circumferentially partially interrupted at several portions (six portions in this embodiment) including the removed portions 29. That is, the cylindrical surface 28 has a circumferentially discontinuous cylindrical shape. However, the proximal end of the stem portion 22 can be formed such that the cylindrical surface 28 can have a circumferentially continuous cylindrical shape, if necessary.

When the anchor portion 20 is inserted into either one of the nuts 40 and 41, the cylindrical surface 28 of the stem portion 22 can be positioned opposite to an inner surface of each of the nuts 40 and 41 while maintaining only a small clearance therebetween. Therefore, if the axis of the anchor 20 is deflected relative to each of the nuts 40 and 41 even a little, the cylindrical surface 28 can interfere with (contact) the inner surface of each of the nuts 40 and 41.

As previously described, the engagement strips 30 of the anchor portion 20 are positioned just below the overhang portions 24a of the head portion 24 and are connected to the stem portion 22 at proximal portions 32 thereof. The engagement strips 30 thus connected can be flexed about the proximal portions 32 thereof due to elasticity of the resin. Each of the engagement strips 30 has two lateral ribs 34 and 35 that are formed in an outer surface thereof. The ribs 34 and 35 are vertically spaced from each other. Therefore, the ribs 34 and 35 may respectively be referred to as upper and lower ribs. Further, the ribs 34 and 35 are arranged and constructed to engage each of female threads 40a and 41a formed in the different nuts 40 and 41. In particular, as shown in FIG. 1, a peripheral edge of each of the ribs 34 and 35 has a rounded or circular arc shape in plan, so as to correspond to a diameter (curvature) of each of the female threads 40a and 41a of the nuts 40 and 41. Further, the peripheral edge of each of the ribs 34 and 35 has a wedge shape in vertical cross section, so as to engage or fit a thread groove of each of the female threads 40a and 41a.

Figure 5:
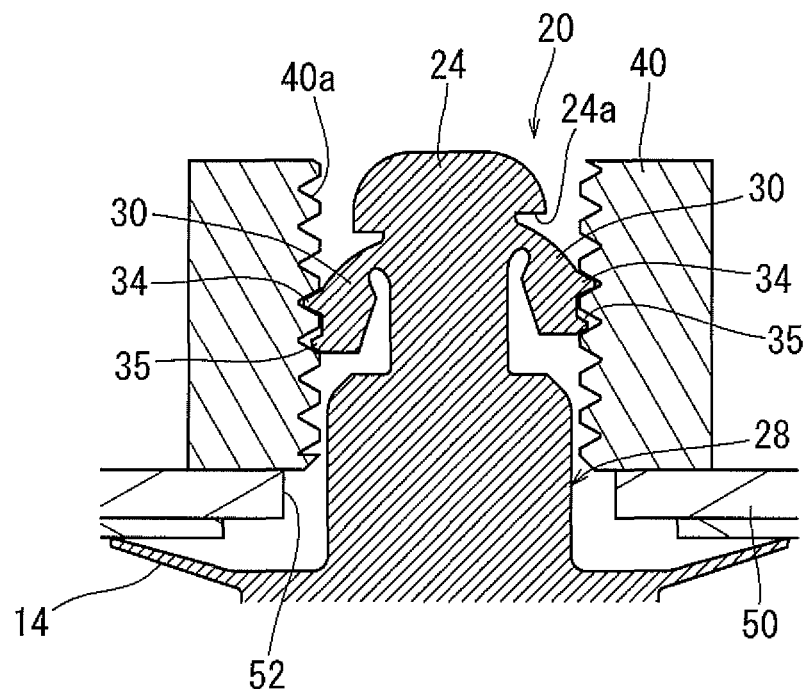
FIG. 5 is a vertical cross-sectional view of the clip, which view illustrates a condition in which an anchor portion of the clip is inserted into a nut having a narrow thread pitch.

The two different types of nuts 40 and 41 are respectively shown in FIGS. 4 and 5. The nuts 40 and 41 are the same in inner diameter. However, the nuts 40 and 41 are different from each other in thread pitch of the female threads 40a and 41a formed therein. In particular, the nut 40 corresponds to "B 0205" of JIS code. The nut 40 has an inner diameter of 10 mm, and a thread pitch of the female threads 40a formed in the nut 40 is 1.25 mm. Conversely, the nut 41 corresponds to "B 0207" of JIS code. The nut 41 has the inner diameter of 10 mm, and a thread pitch of the female threads 41a formed in the nut 41 is 1.50 mm.

Figure 6:
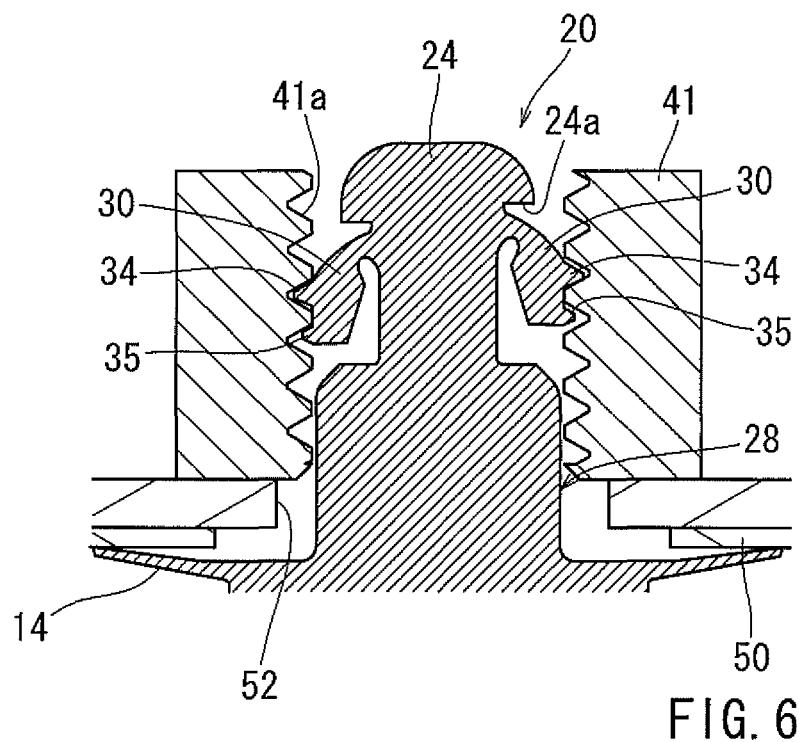
FIG. 6 is a vertical cross-sectional view of the clip, which view illustrates a condition in which an anchor portion of the clip is inserted into a nut having a wide thread pitch.

As shown in FIGS. 5 and 6, each of the nuts 40 and 41 is welded to the metal panel 50 while axially aligned with the through hole 52 formed in the metal panel 50. Originally, each of the nuts 40 and 41 is used to attach a bolt (not shown) to the metal panel 50 in order to attach various parts (not shown) to the metal panel 50. However, the nuts 40 and 41 may not be used in some vehicle models. The clip 10 of the present invention is intended to be attached to the metal panel 50 utilizing each of the nuts 40 and 41 that are not used for the original purpose.

In order to allow the ribs 34 and 35 of the engagement strips 30 to engage each of the female threads 40a and 41a that are different from each other in thread pitch thereof, the peripheral edges of the ribs 34 and 35 are different from each other in vertical cross sectional shape. In particular, the ribs 34 and 35 are formed such that the lower rib 35 (the rib 35 that is away from the head portion 24) is shorter or smaller than the upper rib 34 (the rib 34 that is close to the head portion 24) in vertical cross section. In other words, the ribs 34 and 35 are formed such that the lower rib 35 has a projection amount (length) smaller than the upper rib 34 (FIGS. 5 and 6). The ribs 34 and 35 thus shaped are capable of engaging the thread grooves of the female threads 40a and 41a that are different from each other in thread pitch thereof (FIGS. 5 and 6).

As will be recognized, when the upper rib 34 has the same projection amount as the lower rib 35, for example, if the ribs 34 and 35 are arranged to be capable of engaging the thread groove of the female thread 41a (having a larger or wider thread pitch) formed in the nut 41, the ribs 34 and 35 are not capable of suitably engaging the thread groove of the female thread 40a (having a smaller or narrower thread pitch) formed in the nut 40. This is because if one of the ribs 34 and 35 engages the thread groove of the female thread 40a, the other of the ribs 34 and 35 contacts a thread ridge of the female thread 40a. That is, only one of the ribs 34 and 35 can engage the thread groove of the female thread 40a. However, when the lower rib 35 has the projection amount smaller than the upper rib 34 as described above, if the ribs 34 and 35 are arranged to be capable of engaging the thread groove of the female thread 41a formed in the nut 41, the ribs 34 and 35 can suitably engage the thread groove of the female thread 40a formed in the nut 40.

Next, a method of attaching the clip 10 to the metal panel 50 will now be described in detail with reference to FIGS. 5 and 6.

First, as shown in FIG. 5, when the nut 40 is welded to the metal panel 50, the anchor portion 20 of the clip 10 is inserted into the nut 40 via the through hole 52 formed in the metal panel 50. Upon insertion of the anchor portion 20 into the nut 40, the engagement strips 30 of the anchor portion 20 slidably moves within the female thread 40a formed in the nut 40 while flexed toward the stem portion 22, so that the two ribs 34 and 35 formed in each of the engagement strips 30 can engage the thread groove of the female thread 40a of the nut 40. Thus, the clip 10 can be attached to the metal panel 50 via the nut 40.

At this time, the stabilizer 14 of the clip 10 is pressed against the surface of the metal panel 50 while elastically flexed, so that the clip 10 can be stabilized in posture due to an elastic restoring force of the stabilizer 14.

As shown in FIG. 5, in a condition in which the anchor portion 20 is inserted into the nut 40, the cylindrical surface 28 is positioned within the nut 40. At this time, the cylindrical surface 28 is positioned opposite to the inner surface of the nut 40 while maintaining the small clearance therebetween. Therefore, when a force is applied to the clip 10 in such a direction in which the axis of the anchor 20 is deflected relative to an axis of the nut 40, the cylindrical surface 28 can interfere with (contact) the inner surface of the nut 40, so that the axis of the anchor 20 can be avoided from being deflected relative to the axis of the nut 40. As a result, the clip 10 can be prevented from being rattled.

Similarly, as shown in FIG. 6, when the nut 41 is welded to the metal panel 50, the anchor portion 20 of the clip 10 is inserted into the nut 41 via the through hole 52 formed in the metal panel 50. Upon insertion of the anchor portion 20 into the nut 41, the engagement strips 30 of the anchor portion 20 slidably moves within the female thread 41a formed in the nut 41 while flexed toward the stem portion 22, so that the two ribs 34 and 35 formed in each of the engagement strips 30 can engage the thread groove of the female thread 41a of the nut 41. Thus, the clip 10 can be attached to the metal panel 50 via the nut 41.

According to the present embodiment, the clip 10 thus constructed can be adapted to the two different types of nuts 40 and 41. That is, when the anchor portion 20 of the clip 10 is inserted into each of the nuts 40 and 41, both of the ribs 34 and 35 can engage the thread groove of each of the female threads 40a and 41a that are different from each other in thread pitch thereof. This is because the lower rib 35 has the projection amount smaller than the upper rib 34. Thus, the ribs 34 and 35 (the engagement strips 30) can reliably engage each of the female threads 40a and 41a of the nuts 40 and 41. As a result, even when the anchor portion 20 (the clip 10) is applied with a load in a direction in which the anchor portion 20 is pulled out of each of the nuts 40 and 41, the anchor portion 20 (the clip 10) cannot be easily pulled out of each of the nuts 40 and 41.

Further, in a condition shown in each of FIGS. 5 and 6, when the anchor portion 20 (the clip 10) is applied with the load in the direction in which the anchor portion 20 is pulled out of each of the nuts 40 and 41, the engagement strips 30 can be urged to be flexed outwardly about the proximal portions 32 thereof relative to the stem portion 22. However, at this time, the engagement strips 30 can interfere with (contact) the overhang portions 24a of the head portion 24 at portions adjacent to the proximal portions 32, so as to be effectively prevented from being flexed. As a result, even when the anchor portion 20 (the clip 10) is applied with a large load in a direction in which the anchor portion 20 is pulled out of each of the nuts 40 and 41, the anchor portion 20 (the clip 10) can bear such a large load.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A clip adapted to each of nuts that are the same in inner diameter and are different from each other in thread pitch of female threads formed therein, comprising:
    an anchor portion capable of being inserted into each of the nuts and capable of engaging each of the female threads of the nuts,
    a head portion formed in a distal end of the anchor portion and projected outwardly,
    a cylindrical surface formed in a proximal end of the anchor portion and having an outer diameter that is slightly smaller than an inner diameter of each of the nuts,
    elastic engagement strips formed in both side surfaces of the anchor portion and extended diagonally outwardly from a portion adjacent the head portion toward the proximal end of the anchor portion, and
    two ribs formed in an outer surface of each of the engagement strips and vertically spaced from each other,
    wherein in order to allow the ribs of each of the engagement strips to engage each of the female threads that are different from each other in thread pitch thereof, the ribs are formed such that the rib that is away from the head portion has a projection amount smaller than the rib that is close to the head portion.

2. A clip, comprising:
    an anchor portion capable of being inserted into each of nuts that are different from each other in thread pitch of female threads formed therein,
    an elastic engagement strip formed in a portion adjacent to a distal end of the anchor portion and extended vertically therefrom toward a proximal end of the anchor portion, and
    two ribs formed in an outer surface of the engagement strip and vertically spaced from each other,
    wherein the ribs are formed such that the rib that is away from the distal end of the anchor portion has a projection amount smaller than the rib that is close to the distal end of the anchor portion.

3. The clip as defined in claim 2 further comprising a cylindrical surface formed in the proximal end of the anchor portion and having an outer diameter that is slightly smaller than an inner diameter of each of the nuts.

4. The clip as defined in claim 2 further comprising a head portion formed in the distal end of the anchor portion and projected outwardly.

* * * * *